United States Patent [19]

Flanagan

[11] Patent Number: 4,498,733
[45] Date of Patent: Feb. 12, 1985

[54] REFLECTOR STRUCTURE

[75] Inventor: Robert M. Flanagan, Lincolnshire, Ill.

[73] Assignee: Amerace Corporation, New York, N.Y.

[21] Appl. No.: 394,696

[22] Filed: Jul. 2, 1982

[51] Int. Cl.³ .............................................. G62B 5/122
[52] U.S. Cl. ..................................... 350/102; 350/97; 404/14
[58] Field of Search ................. 350/97, 102, 103, 590; 404/14

[56] References Cited

U.S. PATENT DOCUMENTS

| | | | |
|---|---|---|---|
| 2,351,080 | 6/1944 | Swarovski | 350/102 |
| 3,332,327 | 7/1967 | Heenan | 350/103 |
| 3,924,929 | 12/1975 | Holmen et al. | 350/103 |
| 4,208,090 | 6/1980 | Heenan | 350/97 |

Primary Examiner—John K. Corbin
Assistant Examiner—William Propp
Attorney, Agent, or Firm—David Teschner; Ronald A. Sandler

[57] ABSTRACT

A reflector structure for reflecting light back toward the source thereof and adapted to be secured to an associated support surface, the reflector structure comprising a lens member of light-transmitting synthetic resin having a front face and a rear face. The lens member has a plurality of integrally formed retrodirective reflector elements formed in the rear face and extending outwardly therefrom. Each of the reflector elements in use is individually surrounded by a peripheral wall defining a cell around the individual reflector element. The peripheral walls extend between the plane of the rear face of the lens member and the plane of the associated support surface, the lens member being adapted to be sealed to the associated support surface. In a preferred embodiment the peripheral walls are formed in the lens member, which may be incorporated as part of a pavement marker whereby the peripheral walls defining individual cells significantly increase the impact resistance of the marker while eliminating the need for metallizing and filling of the marker.

14 Claims, 9 Drawing Figures

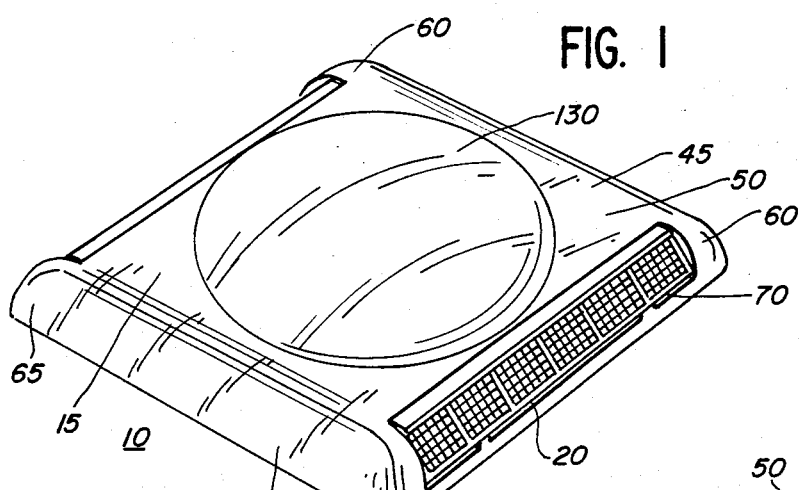
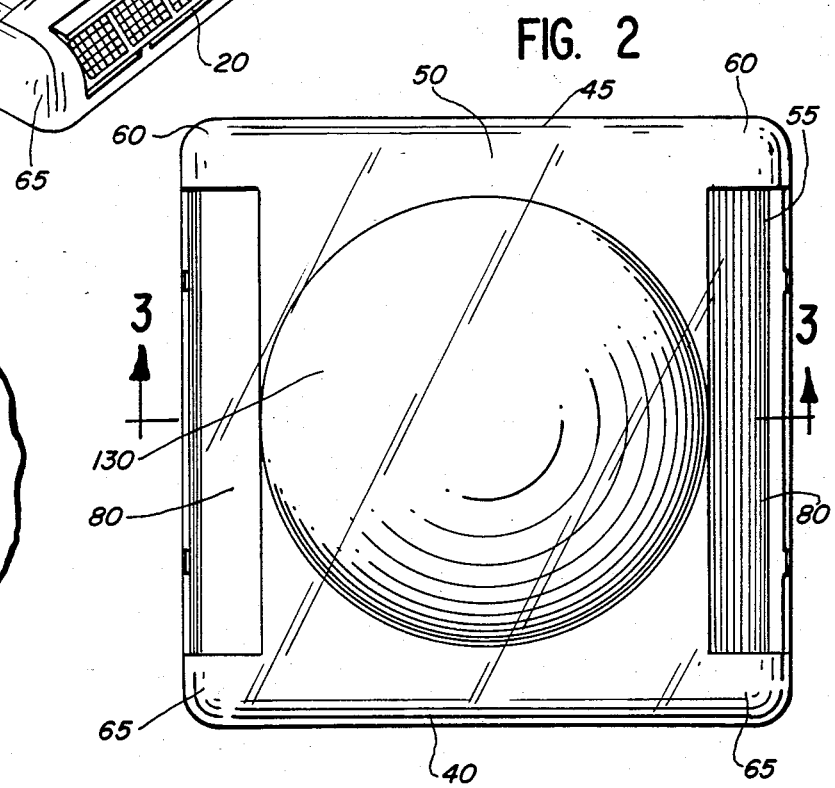
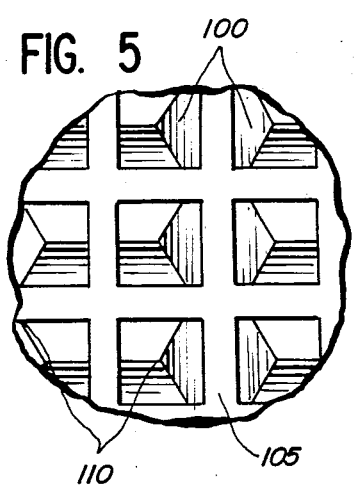
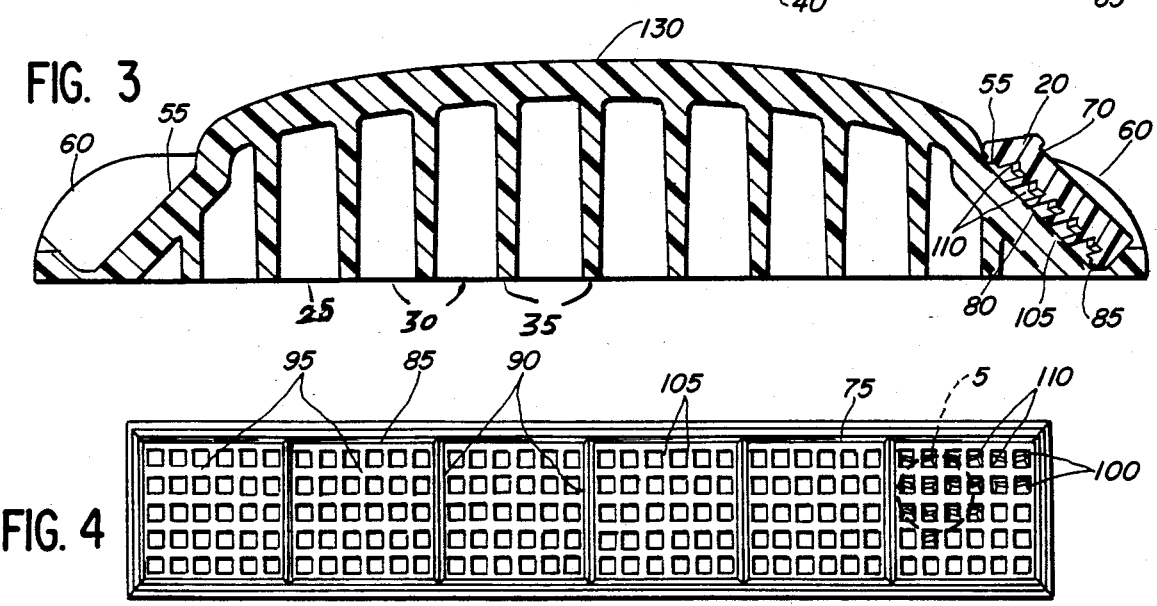

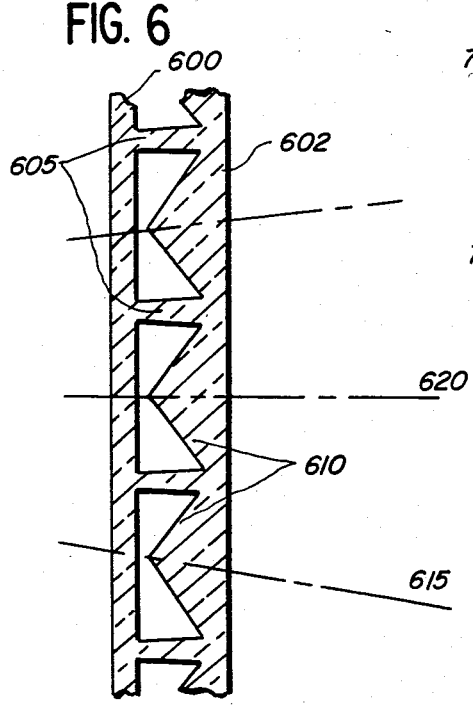
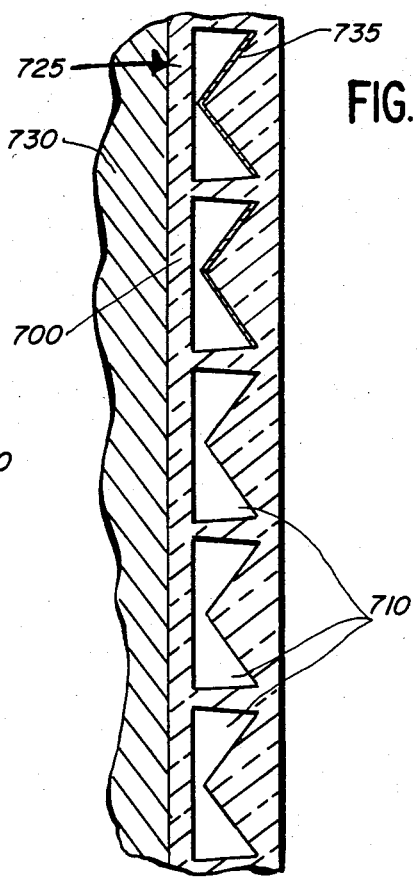
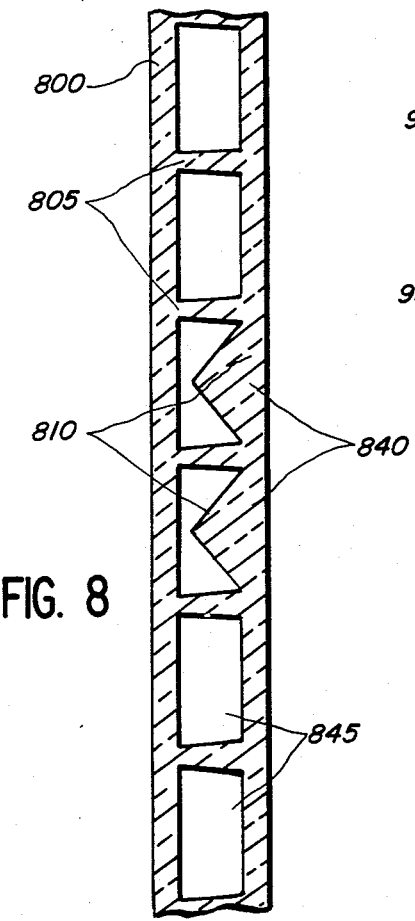
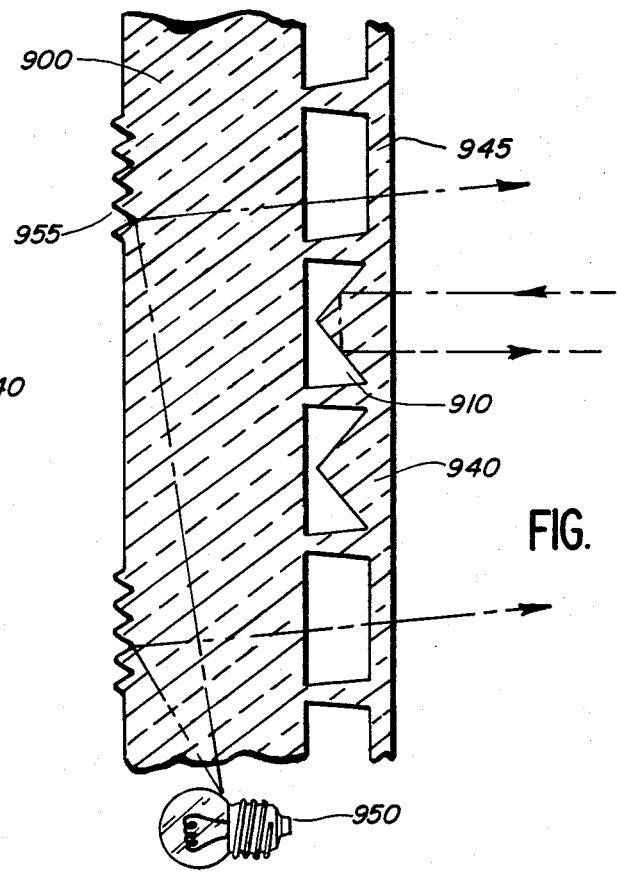

REFLECTOR STRUCTURE

BACKGROUND OF THE INVENTION

The present invention is directed to an improved reflector structure that is substantially more impact resistant than prior reflector structures. In particular, a lens member having a plurality of reflector elements is provided with continuous peripheral walls surrounding each individual reflector element to form a cell. In cube-corner type reflector structures of the type contemplated by the present invention, the reflector elements provide night reflectivity, but contribute little to daylight visibility of the reflector; the underlying support surface and the peripheral walls of the reflector structure are intended to provide daylight visibility.

Generally, reflector structures are made for exposure to all types of weather conditions and abuse incident to such use. They are subject to vandalism and impacts from stones, birds and other objects and debris. One form of the novel reflector structure of the present invention, when used as a pavement marker is specifically designed to receive heavy loads and to resist the high impact forces exerted by vehicle tires impinging thereon. Use of the present invention also eliminates the expensive steps of metallizing the reflector elements and "potting" the marker, with the attendant drop in reflective efficiency.

U.S. Pat. No. 4,208,090, assigned to applicant's assignee, discloses a reflector structure including a body of transparent material having a front face and a rear face. The rear face includes a plurality of cells, each surrounded by a support wall and each illustrated cell containing at lease four cube-corner type reflector elements therein. A problem with pavement markers made in accordance with the '090 patent is that the cells, having multiple reflector elements therein, experience beam type loading, and thus the impact of vehicle tires and of stones, pebbles and the like lodged in the tire thread tend to fracture the cells at relative low impact values. Fractures then allow the cells to fill with dirt and moisture, causing a loss of optical efficiency in all the reflector elemnts of the cell. Placing fewer than four reflector elements in each cell disclosed in the '090 patent and using the support wall structure disclosed therein, would significantly decrease the night time visibility of such a marker because proportionally less area would be used for reflector elements. By contrast, the present invention allows proportionally greater area for reflector elements while preventing impact fractures with an improved support structure.

U.S. Pat. No. 4,227,772, also assigned to applicant's assignee, discloses a pavement marker which includes a base having at least one support wall positioned in use in the direction of an oncoming vehicle. The support wall contains a number of recesses. A lens member places a plurality of retrodirective cube-corner type reflector elements into each recess and hermetically seals the reflector elements in the recesses to form a cell. The relatively low impact resistance of the cells, again caused by beam type loading and the notch effect of the plastic molding, results in fractures at lower impact values than achieved in epoxy filled type pavement markers, such as the type made under Heenan U.S. Pat. No. 3,332,327, assigned to applicant's assignee.

Other attempts to provide adequate strength to withstand impact forces in cell type reflectors have included filling the air cells with epoxy resin or the like. For instance, U.S. Pat. No. 3,924,929, granted to Holmen et al., in FIG. 3 discloses particulate matter being used, in part, to strengthen the construction of the reflector. However, while filling the cell with various materials may increase durability, it also may cause a loss of optical efficiency as high as fifty percent, as well as increase the number of manufacturing steps, material costs and resultant cost of the reflector.

U.S. Pat. No. 2,351,080, granted to Swarovski, discloses a mass of material into which reflective elements are individually embedded. The elements, presumably glass, are provided with facets overlapped by the embedding mass at the border of the light reflecting faces. Although the embedding principle theoretically increases the impact resistance of the reflector, the principle does not achieve the result of the present invention, with attendant savings in cost and efficiency. Moreover, the reflective elements of an air cell reflector would be rendered non-reflective, if the embedding mass were in contact with the faces, as disclosed in Swarovski.

SUMMARY OF THE INVENTION

The present invention comprises a novel reflector structure capable of providing substantially improved impact durability without visibility loss. The problems in prior markers and reflectors as discussed above are obviated by the present invention, all without deleterious consequences.

It is a primary object of the invention to provide an improved reflector structure of the type set forth that has better durability, reflectivity, and weatherability characteristics.

A further object of the present invention is to provide a reflector structure in which the notch normally created by the intersection of the faces of cube-corner type reflector elements and the body of which they are molded, are disposed adjacent to peripheral walls thereby to minimize deflection caused by a load on the lens structure.

It is another object of the present invention to provide a reflector structure utilizing peripheral walls around each reflector element as columnar support to minimize the deflection and strain caused by an impact load applied on or near the peripheral walls.

It is an object of the present invention to provide an improved pavement marker utilizing the reflector structure of the invention which marker is thus substantially more durable and provides substantial daytime and night time reflectivity, at least equal to the existing forms of pavement markers described herein.

It is yet another object of the present invention to provide a pavement marker in which the reflective elements thereof are relatively small and individually sealed, so that in the event of damage or destruction to any one of the reflective elements, the pavement marker still can effectively function to provide continued reflectivity.

The present invention comprises a novel reflector structure which includes a lens member having a front face and a rear face. A plurality of retrodirective reflector elements are formed in the rear face. Each of the reflector elements is individually surrounded by a continuous peripheral wall defining a cell around each individual reflector element and extending outwardly from the plane of the reflector elements. The rear surfaces of the peripheral walls define a substantially continuous support web extending substantially over the rear face of the lens member.

To the accomplishment of the foregoing and still other objects and advantages, the invention, is best utilized in, a pavement marker for providing a marking signal on a roadway surface capable of resisting impact forces exerted by vehicle tires impinging thereon, reflecting daylight falling thereon, and reflecting light back toward the source thereof, so as to be visible to a driver in an approaching vehicle. The pavement marker includes a base having a generally horizontal bottom surface, the base having at least one support surface positioned in use in the direction of the approaching vehicle. Affixed to the base is a lens member of light-transmitting synthetic resin, which includes a front face and a rear face. The lens member has a plurality of retrodirective reflector elements formed in the rear face. Each reflector element is individually surrounded by a continuous peripheral wall defining a cell around the individual reflector element and extending between the plane of the rear face of the lens member and the plane of the associated support surface, thereby forming an impact resistant structure. The reflector elements are positioned and arranged to reflect light falling upon the front face of the lens member back towards the source thereof to render the marker highly visible.

BRIEF DESCRIPTION OF THE DRAWINGS

The invention, together with further objects and advantages thereof, can best be understood by reference to the following specification, taken in connection with the accompanying drawings, in which:

FIG. 1 is a perspective view of a pavement marker carrying thereon a reflector structure constructed in accordance with the present invention;

FIG. 2 is a top plan view of the pavement marker of FIG. 1;

FIG. 3 is an enlarged view in vertical section taken along the line 3—3 in FIG. 2;

FIG. 4 is an enlarged view of the rear face of a lens member forming a part of the pavement marker of FIG. 1, taken in a direction perpendicular to the rear face thereof; and FIG. 5 is a fragmentary view, on an enlarged scale, of a portion of the rear reflective surface of the lens member within the circle 5 of FIG. 4, but taken in direction parallel to an axis equidistant from the three mutually perpendicular faces forming the cube-corner type reflector element.

FIG. 6 is a diagrammatic sectional view of a reflector structure which includes a preferred embodiment of the present invention.

FIG. 7 is a diagrammatic sectional view of a reflector structure which incorporates a second embodiment of the present invention.

FIG. 8 is a diagrammatic sectional view of a reflector structure which illustrates a third embodiment of the present invention.

FIG. 9 is a diagrammatic sectional view of a reflector structure which illustrates yet a fourth embodiment of the present invention.

DETAILED DESCRIPTION OF THE PRESENTLY PREFERRED EMBODIMENTS

A reflector structure constructed in accordance with the present invention and incorporated in a pavement marker, is shown in FIGS. 1, 2, and 3. The marker is generally designated by the numeral 10 and comprises a body or base 15, preferably of an opaque, light-diffusing synthetic resin having mounted thereon two lens members, each generally designated as 20. The base 15 preferably is molded or formed as a one-piece member to provide a durable structure capable of withstanding impact forces applied to the marker 10 when struck by a tire or other object. More particularly, the base 15 has a generally horizontal bottom surface 25 with a plurality of generally rectangular molding recesses 30 formed therein. The molding recesses 30 extend well up into the base 15. The base 15 thus includes a plurality of substantially vertically extending partitions or walls 35 defining the recesses 30, and a pair of upstanding opposed sidewalls 40 and 45, all interconnected by a top wall 50.

A pair of inclined support surfaces 55 is disposed at opposite ends of the base 15, and each is positioned such that when the marker 10 is in use, the surfaces 55 will face the directions of approaching vehicles. Each of the support surfaces 55 is provided at the terminal ends thereof with upstanding shoulders 60 and 65 which respectively project outwardly beyond the outer surfaces of the support surfaces 55, to provide protection for the corners of the lens member 20.

However, it will be understood that the lens member 20 which provides the reflective structure for reflecting light back toward the source thereof, thereby rendering the pavement marker highly visible at night, is best illustrated in FIGS. 3 through 5. The lens member 20 is formed of a light-transmitting synthetic resin and includes a substantially planar front face 70 and a rear face 75. The illustrated lens member 20 is generally rectangular and is intended to be positioned in a channel 80 provided between the upstanding shoulders 60 and 65 along the support surface 55. The lens 20 may comprise different shapes, depending upon the intended end use of the reflector system.

The rear face 75 illustrated in FIG. 4, before securement to the base 15, is provided with an energy directive sealing bead 85 which extends about the entire periphery of the lens member 20. The sealing bead 85 includes a portion (not shown) which is originally in the form of a generally triangular bead. The rear face 75 also may be provided with a plurality of dividing beads 90, which intersect the sealing bead 85 at equally spaced distances, thereby dividing the lens member 20 into a plurality of generally rectangular sections 95 circumscribed by the sealing bead 85 and the dividing beads 90. The dividing beads 90 originally also may include raised triangular energy directing portions (not shown).

The sealing bead 85 and dividing beads 90 originally may be provided on the support surface 55 of base 151 instead of on the lens member 20. The present invention contemplates the position of the plurality of beads 85 and 90 extending between the support surface and the lens member, irrespective of their original attachment.

The lens member 20 is intended to be positioned over the inclined support surface 55 of the base 15 and rigidly secured thereto by ultrasonic welding. When the lens member 20 is ultrasonically welded to the base 15, the sealing beads become substantially flattened as a result of the energy imparted thereto, whereby the periphery of the lens member 85 directly abuts the support surface 55 as best illustrated in FIG. 3. A substantial welded surface area is visible through the transparent lens member 20 as seen in FIG. 1.

Similarly, the dividing beads 90 also are substantially flattened as they are ultrasonically welded to the underlying support surface 55. After welding the lens member 20 to the base 15, the dividing beads 90 cooperate with the sealing bead 85 to hermetically seal the sections 95.

The pavement marker 10 is provided with a retrodirective cube-corner type reflector system to effect the signal function of reflecting light back to the driver of an approaching vehicle whose headlights illuminate the pavement marker. Cube-corner type reflector elements are defined generally as comprising three mutually perpendicular faces which operate to retroreflect light in a direction parallel to its direction of incidence. The three faces need not be equal in size or shape.

As best seen in FIG. 4, the rear face 75 of the lens member 20 is configured to provide a plurality of cube-corner type retrodirective reflector elements 100. The apex of each element extends outwardly from the rear face 75 of the lens member 20. An important aspect of the present invention is that each of the reflector elements 100 is completely surrounded by a continuous peripheral wall 105, to form a web adapted to extend between the support surface 55 and rear face 75.

As seen in FIG. 3, in the illustrated preferred embodiment, the apices 110 of the reflector elements 100 are surrounded by the peripheral walls 105 which extend outwardly from the rear face and beyond the plane of the apices 110. When the peripheral walls 105 of the reflector elements 100 rest upon the support surface 55, the apices 110 preferably do not contact the support surface 55. Thus, a plurality of air cells are formed, each containing a single reflective element 100. This is an important feature of the present invention which leads to an improvement in durability of the marker.

Air cells formed in the prior art markers had notches at the point of intersection of the reflector element faces and the beam-like support arrangement. A load placed upon a reflector structure concentrates stress at the notches in the beam. The present invention avoids fractures by eliminating the notches and the stress points they create. The present invention accomplishes this by surrounding each reflective element 100 with the peripheral wall 105 to provide "columnar" support directly between the load and the body of the reflector structure.

In addition to the sealing bead 85 and the dividing beads 90, some or all of the peripheral walls 105 may be sealed by ultrasonic welding or other conventional means, i.e. adhesives, etc., to form a hermetically sealed air cell for the individual reflector elements 100. The peripheral walls 105 may be formed from the support surface 55 or on the lens member 20 as illustrated. In either instance, the support surface 55 and peripheral walls 105 exclude water, dirt, and the like, from the reflector elements 100. Preventing the entry of such materials upon the reflecting faces of the reflecting elements 100 preserves their optimum light-reflecting properties. Moreover, if each reflector element 100 is individually sealed, a break in the lens member 20 or in the base 15, which may permit access of water, dirt, and the like, into one cell, should not adversely affect other cells. Consequently, the reflector structure exhibits great weatherability and durability in use. Even when the reflector structure is extremely thin, as will be explained more fully hereinafter, a break or impairment in one of the cells should not propagate to adjacent cells.

The contact between the peripheral walls 105 and the support surface 55 distributes any load applied to the front face 70 of the lens member 20 throughout the base 15. It is not necessary that the peripheral walls 105 of the individual cells be sealed in order to achieve this benefit.

A comparison of the impact resistance of the present invention against prior markers such as the type described in U.S. Pat. Nos. 3,332,327 and 4,227,772, reveals a surprisingly significant improvement. Falling dart (¼ inch radius, 190 grams) tests reveal that markers of the present invention were able to withstand more than twice the impact of a reflector element made in accordance with the '772 patent. Two sets of markers were made from Plexiglas DR material as supplied by the Rohm and Haas Company. One set contained reflector elements 0.086 inches square, surrounded by a peripheral wall 0.020 inches wide. A second set of pavement markers also contained reflector elements of the same size but each cell contained four reflector elements surrounded by a supporting wall 0.020 inches thick. The second set of pavement markers failed when impacted with a dart dropped 24 inches, whereas markers made in conformance with the present invention when subjected to the same falling dart did not fracture even at drop distances of 72 inches. The performance of the reflecture structure made pursuant to the present invention in such tests equaled that of epoxy filled pavement markers of the type made in accordance with the '327 patent.

The cube-corner type reflector elements 100 illustrated herein are intended to be generally rectangular when viewed in a direction along the line of the an axis equidistant from the three faces of the reflector element, (sometimes called the trisector), which is perpendicular to the view seen in FIG. 5. Each of the cube-corner type reflector elements 100 includes cooperating faces 115, 120 and 125, respectively, the faces intersecting to form first, second, and third dihedral angles in a manner well-known to those skilled in the art. In order to obtain good reflection, it is desirable that the light from headlights entering the reflector element 100 be directed along the lines essentially parallel to the optical axis of the cube corner element. The optical axis may or may not be aligned with the trisector, in accordance with well known principles. In order to retain maximum reflectivity, the optical axis (the trisector for the illustrated axis), should be arranged at an acute angle with respect to the front face 70.

It should be understood that the present invention contemplates other types of reflector elements and that other geometric shapes and arrangements of the reflector surfaces can be utilized effectively. For instance, triangular shaped reflector elements may be enveloped on its periphery by triangular columns. Square or hexagonal reflector elements also can be used. Furthermore, the reflector elements can be positioned and arranged in patterns which generate wide entrance angle or observation angle and improved orientation responses, all well known to those skilled in this art.

Retroreflective lenses embodying the "columnar" support principle herein disclosed, can be attached to almost any generally smooth surface by ultrasonic welding or adhesive bonding to produce a number of other useful reflector structures besides the pavement markers illustrated. For instance, the lens member of FIG. 4 also could be illustrative of retroreflective cube-corner sheet. If each retroreflective cube is hermetically sealed, the sheeting can be cut anywhere with a resultant sealed edge. Preferably, a backing member would then substantially cover the rear face of the sheet. The backing member would be sealed to at least some of the peripheral walls to provide hermetically sealed areas within. Additionally, a glass coating could be applied to the front face of the lens member to provide abrasion and wear resistant qualities.

Other embodiments utilizing the inventive principles are illustrated in FIGS. 6 through 9. In FIG. 6, lens member 602 is attached to a number of the peripheral walls 602 surrounding each element 610. The cube optical axes 615 are shown to be tilted from a normal cube axis 620 in order to provide wide angle retroreflectance. To further enhance the applicability of such a reflector structure, the lens member 602 may be colored so as to present a colored night time reflective signal. Additionally, the colored backing member 600 would also be seen through the transparent peripheral walls 605 to provide a day time background color if desired. A few of the reflector structures which could embody this columnar support principle include warning signals; delineators for barriers dividing roads and for guardrails; rear surfaces on vehicles; and plastic, metal, rubber or ceramic lane line markers.

Identification structures could be made with the present invention using optical coding or switching formed by obliterating individual reflective elements to produce the code. As shown in FIG. 7, an adhesive layer 725 can be added to a backing member 700 to enable attachment to an associate support surface 730, i.e., a freight car wall. Certain elements could be obliterated, like 735, with a black dye or some other conventional means. Thus, a coded retroreflective signal is provided by elements 710.

Signs could be customized to have individual retroreflective elements positioned to form numbers, letters, or other designs. In this case, no reflective elements would be disposed within areas surrounded by the peripheral walls 805. FIG. 8 illustrates this concept with retroreflective elements placed in cells 840 adjacent to "window" cells 845, which do not contain retroreflective elements 810. The cells 845 provide a window to allow viewing of the backing member 800, while the entire lens member remains impact resistant.

FIG. 9 illustrates another embodiment which adds a light source 950 to a reflector structure similar to that illustrated in FIG. 8. The backing member 900 is modified by placing reflective grids 955 to reflect light through the window cells 945. The retroreflective elements 910 in the adjacent cells 940 provide the reflective night time signal. Thus, the structure provide two types of signals: retroreflective and illuminated.

With respect to pavement marker 10, the upstanding shoulders 60 and 65 extend outwardly beyond the support surfaces 55 of the base 15 to provide the channels 80 within which are disposed the lens members 20. The upstanding shoulders 60 and 65 provide further structural support and protection for the lens member 20 by absorbing and distributing the force of the tire impact throughout the base 15.

The arrangement of the lens member 20 with its sealing bead 85, the dividing beads 90, the peripheral walls 105, and the underlying light-diffusing opaque support surface 55, impart substantial daytime visibility to the pavement marker. In the illustrated embodiment, the total area of the lens member 20 occupied by the sealing bead 85, the dividing beads 90, and the peripheral wall 105, is substantially equal to that occupied by the reflector elements 100.

The opaque, light-diffusing base serves to reflect daylight impinging thereon towards an observer. To enhance the daytime signal at high sun angles, an elliptically shaped dome 130 is placed over the top wall 50. At a distance, the uniform spacing of sealing bead 85, the dividing beads 90, and the peripheral walls 105, cause the pavement marker 10 to appear as a substantially uniform reflective body. The individual reflector elements 100 tend to disappear to the eye of the observer at significantly shorter distances than prior types of markers. Also, the intensity of the daytime reflection is improved.

Alternatively, under night time driving conditions, the uniform size and spacing of the reflector elements 100 cause the pavement marker 10 to appear as a uniform reflective member, the peripheral walls 105 which improve daytime visibility disappearing under evening driving conditions.

It is not necessary to include the dividing beads 90 in the lens member 20, in order to achieve these benefits. The improvements in durability and visibility also accrue to those embodiments contemplated by the present invention which do not use dividing beads. While the preferred embodiment has six sections 95 formed by the dividing beads 90, these sections are unnecessary to achieve substantially the same daytime and night time reflective qualities. In the event of damage to one or more of the reflector elements, only that particular air cell containing the reflective element loses its hermetic seal and thereby ultimately becomes optically ineffective.

The peripheral walls 105 may be intergrally formed as part of the support surface 55, or of the lens member 20 as shown, or as a separate piece.

The base 15 may be made of a metal, a ceramic, a thermoplastic resin such as acrylonitrile butadiene styrene (commonly known as ABS), glass-filled ABS, methyl methacrylate or rubber-modified methyl methacrylate (commonly known as Plexiglas DR), or a polycarbonate such as Lexan, or may be made of a thermosetting material and be adhesively mounted. The lens member 20 may be methyl methacrylate or a rubber-modified methyl methacrylate or Lexan.

Although the base 15 may be formed of clear synthetic organic plastic resin, a color such as red, yellow, blue and the like may be incorporated to give a colored signal in daylight. Alternatively, the reflecting elements 100 of the lens member 20 may be colored, to give a colored signal at night. Normally, the lens member 20 and base 15 will be chosen to provide the same colors, day and night, with the specific color being determined by the specific function of the marker, e.g., median delineation or edge delineation of the roadway.

A typical marker constructed in accordance with the present invention for use on a highway has a lens member with a length of about 4.0 inches and a variable height depending upon use. The length of the side of each of the reflector elements 100 viewed in FIG. 4 is 0.056 inches; and the width of the peripheral wall 105 between adjacent cells is preferably less than about 0.025 inches. The depth of each reflector element is about 0.10 inches.

Less than half of the total area of the lens member 20 is used for support structure in order to reap the benefits previously discussed. The ratio between the maximum dimension of the individual reflector element 100 and the thickness of an adjacent peripheral wall 105 is preferably no less than about 2 to 1. If the ratio is below this number, the strength of the marker increases, at the expense of losing night time reflectivity, because any area used for the peripheral walls reduces the area which could otherwise be used for the reflector elements.

From the above, it is seen that there has been provided a reflector structure, in particular a pavement marker, which fulfills all of the objects and advantages set forth above. The reflector structures of the present invention have improved durability and day time as well as night time visibility. These advantages are achieved by eliminating the notches present in prior art arrangements which are sensitive to breakage. Also, they are substantially less expensive to manufacture because vacuum metallizing and epoxy filling operations are eliminated.

It has been further demonstrated that the present invention provides reflector structures which are significantly more impact resistant. The attendant increase in durability reduces replacement frequency and thus cost. Furthermore, no deleterious consequences accompany this increase in impact resistance. In fact, at shorter distances uniformity of daytime reflection is significantly enhanced. Also, the versatility of the present invention allows various geometrical arrangements and shapes for the reflector elements themselves.

It should be understood that the present invention is not limited to the precise structure of the illustrated embodiments, it being intended that the foregoing description of the presently preferred embodiments be regarded as an illustration rather than as a limitation of the present invention. It is the following claims, including all equivalents, which are intended to define the scope of the invention.

What is claimed is:

1. A pavement marker for providing a marking signal on a roadway surface capable of resisting impact forces exerted by vehicle tires impinging thereon and reflecting light back toward the source thereof, so as to be visible to a driver in an approaching vehicle, said pavement marker comprising:
   a base having at least one support surface positioned in use in the direction of an approaching vehicle;
   a lens member of light-transmitting synthetic resin having a front face and a rear face, said lens member being carried by said support surface;
   said lens member having a plurality of cube-corner tye retrodirective reflector elements integrally formed in said rear face and extending outwardly therefrom;
   each of said reflector elements being individually surrounded by a continuous peripheral wall, said walls extending between the plane of said rear face and said support surface, said peripheral walls defining individual cells round each said individual reflector elements, thereby forming an impact resistant structure;
   the ratio between the maximum dimension of each said reflector element in plan view and the thickness of an adjacent peripheral wall being no less than about 2 to 1
   said reflector elements being positioned and arranged to reflect light falling upon said front face of said lens member back toward the source thereof to render said marker highly visible at night.

2. The pavement marker as defined in claim 1, wherein said marker includes a sealing bead between said lens member and said support surface and extending along the periphery of said lens member to affix said lens member to said support surface.

3. The pavement marker as defined in claim 1, wherein said peripheral walls are no greater than about 0.025 inch thick.

4. The pavement marker as defined in claim 1, wherein at least some of said peripheral walls are sealed to said support surface and to said lens member thereby to secure said lens member to said base.

5. A pavement marker for providing a marking signal on a roadway surface capable of resisting the forces exerted by vehicle tires impinging thereon, reflecting daylight falling thereon, and reflecting light back toward the source thereof, so as to be visible to a driver in an approaching vehicle, said pavement marker comprising:
   a base of an opaque, light-diffusing synthetic resin having at least one support surface positioned in use in the direction of an approaching vehicle;
   a lens member of light-transmitting synthetic resin having a front face and a rear face;
   said lens member having a plurality of cube-corner type retrodirective reflector elements formed in said rear face;
   said reflector elements each being individually surrounded by a continuous peripheral wall extending from said rear face and defining individual cells around said individual reflector elements, said peripheral walls extending between the rear face of said lens member and said support surface, thereby forming an impact resistant structure;
   said peripheral walls being sealed to said support surface to provide hermetically sealed areas within said cells;
   said reflector elements being positioned and arranged to reflect light falling upon said front face of said lens member back toward the source thereof to render said marker highly visible at night.

6. The pavement marker as defined in claim 5, wherein said cube-corner reflecting elements substantially fill the rear face of said lens member and are generally square in plan view when viewed parallel to the optical axes.

7. A pavement marker as defined in claim 5, wherein the ratio between the maximum dimension of said reflector element in plan view and the thickness of said peripheral wall is no less than about 2 to 1.

8. A pavement marker as defined in claim 5, wherein the thickness of said peripheral wall is no greater than about 0.025 inch.

9. A reflector structure for reflecting light back toward the source thereof and adapted to be secured to an associated support surface, said reflector structure comprising:
   a lens member of light transmitting synthetic resin having a front face and a rear face;
   said lens member having a plurality of integrally formed retrodirective reflector elements formed in said rear face and extending outwardly therefrom;
   each of said reflector elements in use being individually surrounded by a peripheral wall defining a cell around said individual reflector element, said peripheral walls extending between the plane of said rear face of said lens member and the plane of an associated support surface;
   said lens member being adapted to be sealed to an associated support surface;
   said reflector elements being positioned and arranged to reflect light falling upon said front face of said lens member back toward the source thereof to render said reflector structure highly visible.

10. The reflector structure set forth in claim 9, wherein said peripheral walls are formed in said lens member and extend outwardly from the rear face thereof and beyond the individual reflector elements.

11. The reflector structure set forth in claim 9, wherein each of said reflector elements is spaced from the adjacent reflector element a distance sufficient to receive the peripheral wall, and wherein said peripheral walls are formed in the underlying associated support surface.

12. A reflector structure for reflecting light back toward the source thereof, said reflector structure comprising:

a lens member of light transmitting synthetic resin having a front face and a rear face;

said lens member having a plurality of retrodirective cube-corner type reflector elements integrally formed in said rear face and extending outwardly therefrom;

each of said reflector elements being individually surrounded by a peripheral wall defining a cell around said reflector element, said peripheral walls extending rearwardly from said rear face and being integrally formed therewith;

the rear surfaces of said peripheral walls defining a substantially continuous web extending substantially over said rear face of said lens member;

said reflector elements being positioned and arranged to reflect light falling upon said front face of said lens member back towards the source thereof to render said reflector structure highly visible.

13. A reflector structure as defined in claim 12 wherein the thickness of said peripheral wall is no greater than about 0.025 inch.

14. A reflector structure as defined in claim 12, wherein the ratio between the maximum dimension of said reflector element in plan view and the thickness of said peripheral wall is no less than about 2 to 1.

* * * * *